US008819783B2

(12) United States Patent
Amirov et al.

(10) Patent No.: US 8,819,783 B2
(45) Date of Patent: *Aug. 26, 2014

(54) EFFICIENT DATA STRUCTURES FOR MULTI-DIMENSIONAL SECURITY

(75) Inventors: Anton Amirov, Redmond, WA (US); George Randell Dong, Issaquah, WA (US); Sanjay Jacob, Redmond, WA (US); Mark Xiahong Yang, Sammamish, WA (US); Rohan Ratnakar Shetty, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/476,402

(22) Filed: May 21, 2012

(65) Prior Publication Data

US 2012/0233667 A1    Sep. 13, 2012

Related U.S. Application Data

(63) Continuation of application No. 11/707,663, filed on Feb. 16, 2007, now Pat. No. 8,196,184.

(51) Int. Cl.
*H04L 29/06* (2006.01)
*G06F 17/30* (2006.01)

(52) U.S. Cl.
CPC .......... *H04L 63/08* (2013.01); *G06F 17/30592* (2013.01); *Y10S 707/957* (2013.01)
USPC ................. 726/4; 707/957; 707/600

(58) Field of Classification Search
CPC .......... H04L 63/08; G06F 17/30592

USPC .............................................. 726/4
See application file for complete search history.

(56) References Cited

U.S. PATENT DOCUMENTS

| 5,615,347 | A | 3/1997 | Davis |
| 6,275,824 | B1 | 8/2001 | O'Flaherty |
| 6,473,764 | B1 | 10/2002 | Petculescu |
| 6,477,536 | B1 | 11/2002 | Pasumansky |
| 6,594,672 | B1 | 7/2003 | Lampson |
| 6,684,207 | B1 | 1/2004 | Greenfield |
| 6,839,711 | B1 | 1/2005 | Reddy |
| 7,467,414 | B2 | 12/2008 | Schlesinger |
| 2003/0037263 | A1* | 2/2003 | Kamat et al. .......... 713/202 |

(Continued)

OTHER PUBLICATIONS

U.S. Appl. No. 11/707,663, Office Action mailed Mar. 4, 2010, 30 pgs.

(Continued)

*Primary Examiner* — Brandon Hoffman
*Assistant Examiner* — Thong Truong
(74) *Attorney, Agent, or Firm* — Thomas Wong; Jim Ross; Micky Minhas

(57) ABSTRACT

Efficient data structures are generated to enforce permissions on a multi-dimensional representation in a performance management application. A model site is generated having at least one model with at least one dimension. User permissions and group permissions are set for the model. The user permission and the group permissions are deployed to a relational database. A collective user permission table is generated based on the user permissions and the group permissions. Thus, an end user may receive permissions associated with a model and permissions associated with particular dimensions of a model without an inefficient consumption of resources.

20 Claims, 11 Drawing Sheets

(56) References Cited

U.S. PATENT DOCUMENTS

| | | |
|---|---|---|
| 2005/0097122 A1 | 5/2005 | Schafflutzel |
| 2006/0010157 A1 | 1/2006 | Dumitrascu |
| 2008/0201766 A1 | 8/2008 | Amirov |

OTHER PUBLICATIONS

U.S. Appl. No. 11/707,663, Amendment and Response filed May 31, 2010, 10 pgs.

U.S. Appl. No. 11/707,663, Office Action mailed Aug. 20, 2010, 36 pgs.

U.S. Appl. No. 11/707,663, Amendment and Response filed Nov. 19, 2010, 9 pgs.

U.S. Appl. No. 11/707,663, Office Action mailed Feb. 16, 2011, 43 pgs.

U.S. Appl. No. 11/707,663, Amendment and Response filed Jun. 16, 2011, 11 pgs.

U.S. Appl. No. 11/707,663, Office Action mailed Aug. 18, 2011, 6 pgs.

U.S. Appl. No. 11/707,663, Amendment and Response filed Nov. 18, 2011, 8 pgs.

U.S. Appl. No. 11/707,663, Notice of Allowance mailed Nov. 22, 2011, 7 pgs.

\* cited by examiner

EFFICIENT DATA STRUCTURES FOR MULTI-DIMENSIONAL SECURITY

CROSS-REFERENCE TO RELATED APPLICATIONS

This application is a continuation of and claims priority to application Ser. No. 11/707,663, filed Feb. 16, 2007, entitled EFFICIENT DATA STRUCTURES FOR MULTI-DIMENSIONAL SECURITY, indicated to be issued as U.S. Pat. No. 8,196,184, on Jun. 5, 2012, which is hereby incorporated by reference in its entirety.

BACKGROUND

Enterprise businesses continuously strive to improve operations, products, services and efficiency. For example, many enterprise businesses use integrated performance management applications for managing business data. Modelers associated with the integrated performance management application may generate model sites to include models, model dimensions, users, and business roles. End users of the model site may view the models of the enterprise business, generate reports, and analyze trends associated with the enterprise business. In many instances, a modeler may desire restricting permissions associated with a model site, models and/or dimensions of a model. The modeler may desire restricting a permission of a user and/or a permission of a business role. Such restricting is difficult to implement in a model and is tacking on resources when pushed from a relative data store to a multi-dimensional store.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

The disclosure pertains to generating efficient data structures to enforce permissions associated with a multi-dimensional representation. A model site is generated having a model with a dimension. User permissions and group permissions are set for the model and the dimension. The user permissions and the group permissions are deployed to a relational database. A collective user permissions table is generated based on the user permissions and the group permissions to efficiently provide security for the model site.

In this manner, setting user permissions and setting group permissions are more efficient and versatile. Also, the tacking of system resources is reduced by generating a collective user permissions table to push from a relative data store to a multi-dimensional store. Thus, an end user may receive permissions associated with a model and/or permissions associated with particular dimensions of a model without an inefficient consumption of resources.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 represents an exemplary user interface view for business roles and users assigned to business roles in a model site;

FIG. 3 represents an exemplary user interface view for managing permissions of a model associated with a model site;

FIG. 5 represents an exemplary user interface view for setting a medium default permission for a model associated with a model site;

FIG. 6 represents an exemplary user interface view for setting a low default permission for a model associated with a model site;

FIG. 7 represents an exemplary user interface view for permission customization;

DETAILED DESCRIPTION

Figure 1:
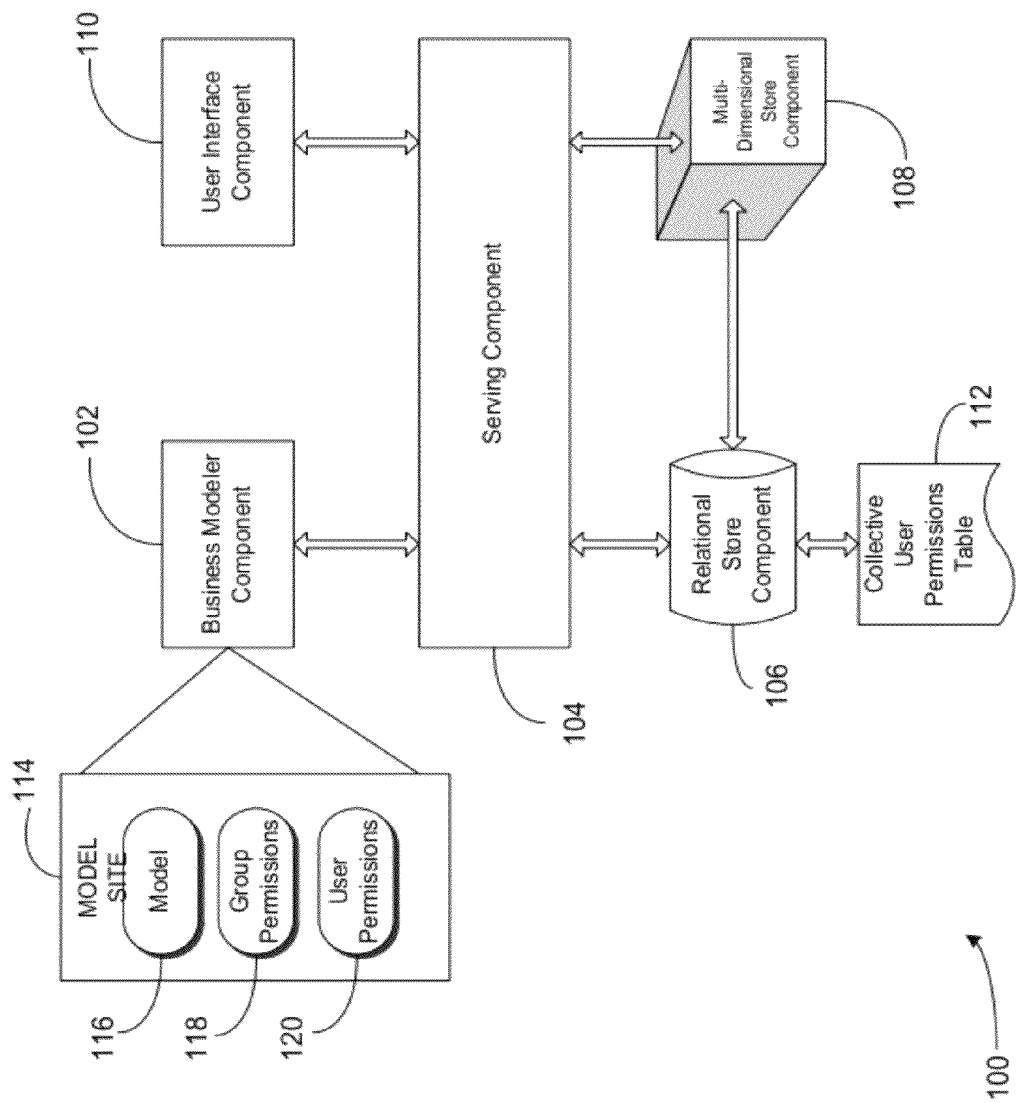
FIG. 1 represents one exemplary system overview for multi-dimensional security in a performance management application.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps or modules.

A business modeler is used in integrated performance management applications in order to manage application metadata and business data. A business modeler may create a model site that includes one or more models for conveying information about a business. For example, the model may include a financial model for an entire corporation. In generating a model site, a business modeler may also identify users for the model site. For example, the business modeler may identify a particular set of employees for associating with a model of the model site. A business modeler may also associate a group with the model site. For example, in an enterprise business, the modeler may identify that regional managers are to be associated with a particular model.

To provide security for the data of the model site, the modeler may grant several permissions. Permissions may include a read permission, a write permission, a read-write permission, calculation permission, no permission, and/or any other type of permission granted for data security. Permissions may be granted in the situation where some employees are to have access to a first set of data and other employees are to have access to a second set of data. The modeler defines group permissions. In the situation where the group is a "regional manager" role, the modeler may set default permissions for all the regional managers associated with the enterprise. The modeler may also customize permissions for a particular user. For example, the modeler may desire a regional manager of Washington to have access to the regional data from Washington, but not have access to the regional data of Nebraska.

A modeler deploys the permissions to a relational store. A collective user permissions table is generated. The collective user permissions table identifies user permissions based on the user permissions assigned by the modeler and the group permissions assigned by the modeler. The collective user permissions table is a consolidated table in relation to the individual user permissions and the group permissions. The collective user permissions table reduces resources needed to identify user permissions. The collective user permissions are pushed to a multi-dimensional store. An end user may then receive permissions with a model. As an example, the end user may have access to a particular model, a portion of the dimensions of a model, and/or a portion of the data of a model.

FIG. 1 represents one exemplary system overview for multi-dimensional security in a performance management application. System 100 represents a modular overview of a computing environment. System 100 may include business modeler component 102, serving component 104, relational store component 106, multi-dimensional store component 108, and user interface component 110. Business modeler component 102, serving component 104, relational store component 106, multi-dimensional store component 108, and user interface component 110 may be integrated into separate components (as shown) or may include a single component performing various functions. System 100 may be associated with one or more computing devices. The computing device may include a desktop computing device, mobile computing device, a laptop, a personal digital assistant, a notebook computer, a serving computer, and/or any other type of computing device functional to store data. In one aspect, the computing device includes computing device 1100 as exemplified in FIG. 11.

System 100 includes business modeler component 102. Business modeler component 102 may include one or more programs for creating, modifying and managing data associated with model sites, models, dimensions, hierarchical views, permissions and/or any other data that may be utilized by multi-dimensional store component 108. Business modeler component 102 may be configured as a graphical user interface tool to allow users to create, modify, and manage data associated with access to a multi-dimensional data store. For example, business modeler component 102 may be utilized by an enterprise manager to grant permissions to cells of an OnLine Analytical Processing "OLAP" cube.

Business modeler component 102 may facilitate the generation of model site 114. For example, model site 114 may include a model site for the financials of the United States division of an enterprise business. Model site 114 may include model 116, group permissions 118, and user permissions 120. Model 116 may include a model and a set of dimensions that are related to the model site 114. Model site 114 provides an interface for turning a model on or off for each business role. For example, model site 114 may include a plurality of accessible models associated with various entities of an enterprise business. In the financial example, a modeler may turn on all or a portion of the models associated with finances while turning off models associated with human resources.

As an example of a model, model 116 may include a profit model. Model 116 may include one or more hierarchical views associated with model 116. Model 116 may include a plurality of hierarchical views that are relevant in formulating model 116. In the profit example, the hierarchical views may include a sales hierarchical view and an expenses hierarchical view that facilitate the generation of model 116.

Model 116 may also include one or more dimensions associated with model 116. Dimension permissions of the model may be static or dynamic. A static dimension permission locks the dimensions broadest value. A dynamic dimension permission may be narrowed or customized from the broadest value. For example, a modeler may mark a dimension permission as static by locking the dimension member permission to the "USA" region. In such a situation, permissions granted for the model will include permission for the "USA" region. When the dimension is marked as dynamic, the modeler may customize the dimension member permissions. For example, the region dimension may include the "USA" region. However, a modeler may set a user permission to the "Washington" region. In such a situation, the user permission is granted for a "lesser" member of the dimension (i.e. Washington is a lesser member of USA).

Model site 114 may also include group permissions 118. A group includes a set of similarly situated users. For example, a group may include "regional managers." In model site 114, the "regional managers" group includes a set of users. A modeler may assign a permission to a group for a model, hierarchical view, and/or dimension. The permission may include a read permission, a write permission, a read-write permission and/or any other type of permission associated with the access of data. When a modeler assigns a permission to a group, all the users of the group are given the same permission unless the modeler customizes the permission of a specific user associated with the group.

Model site 114 may also include user permissions 120. A user may or may not be associated with a group. For example, a group of a model may include "regional managers." A user may be included as a regional manager. A user of a model may also include a member that is not part of a group, such as a CEO. A modeler may assign a permission to a user for a model, hierarchical view, and/or dimension. The permission may include a read permission, a write permission, a read-write permission and/or any other type of permission associated with the access of data.

Business modeler component 102 is in communication with serving component 104. For example, business modeler component 102 may communicate with serving component 104 via a wired, wireless, or a combination of communication networks. In one aspect, business modeler component 102 communicates with serving component 104 using web services application programming interfaces (APIs). Serving component 104 is configured to respond to various requests from business modeler component 102 and user interface component 110.

System 100 includes relational store component 106. Relational store component 106 stores date in the form of related tables. Permissions are deployed from business modeler component 102 to relational database store component 106. Relational store component 106 includes collective user permissions table 112. The generation of collective user permissions table 112 is more fully set forth in FIGS. 11 and 12.

System 100 also includes multi-dimensional store component 108. The multi-dimensional store component 108 stores models in one or more cubes and/or sub-cubes. Collective user permissions are pushed, via a star schema or other type of multi-dimensional schema such as a snowflake schema, from relational store component 106 to multi-dimensional store component 108.

Multi-dimensional store component 108 is associated with user interface component 110 via serving component 104. In one aspect, user interface component 110 is associated with a spreadsheet application. Interface component 110 is configured to provide various client-side operations such as submitting data, reviewing data, approving submissions, and the like. In one aspect, user interface component 110 queries multi-dimensional store component 108 to obtain data associated with a cube. User interface component 110 is granted permissions to the cube based on the collective user permissions pushed from relational store component 106 to multi-dimensional store component 108.

Figure 2:
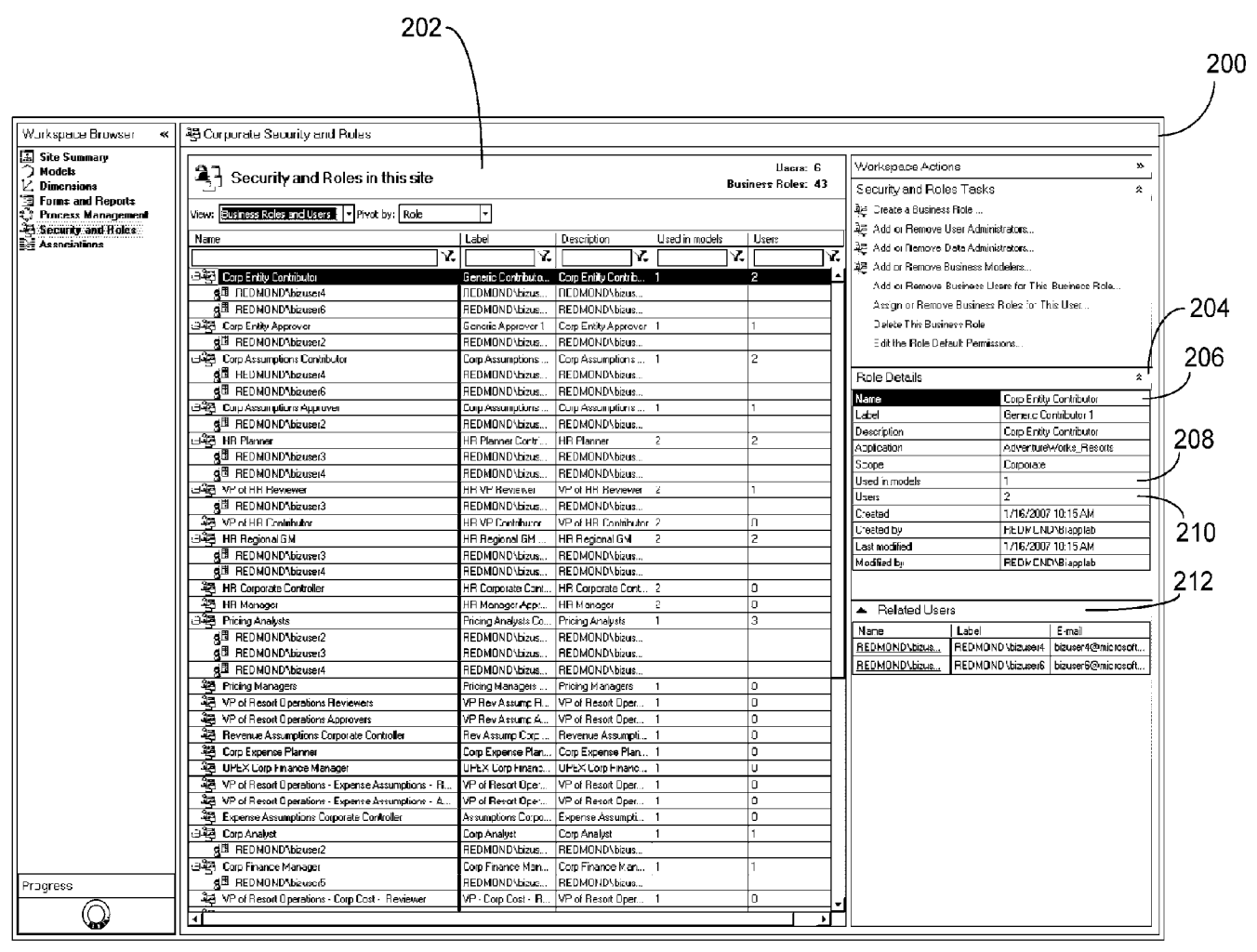

FIG. 2 represents an exemplary user interface view 200 for business roles and users assigned to business roles in a model site. Interface view 200 includes model site security pane 202. Model site security pane includes a one or more groups. As an example, the model site includes a "Corp Entity Contributor" group that includes two users. User interface view 200 also includes group pane 204. Group pane 204 indicates attributes of a role of the group. Group pane 204 includes role name cell 206, model occurrence cell 208, and number of users cell 210. User pane 212 indicates the users associated with the group.

Figure 3:
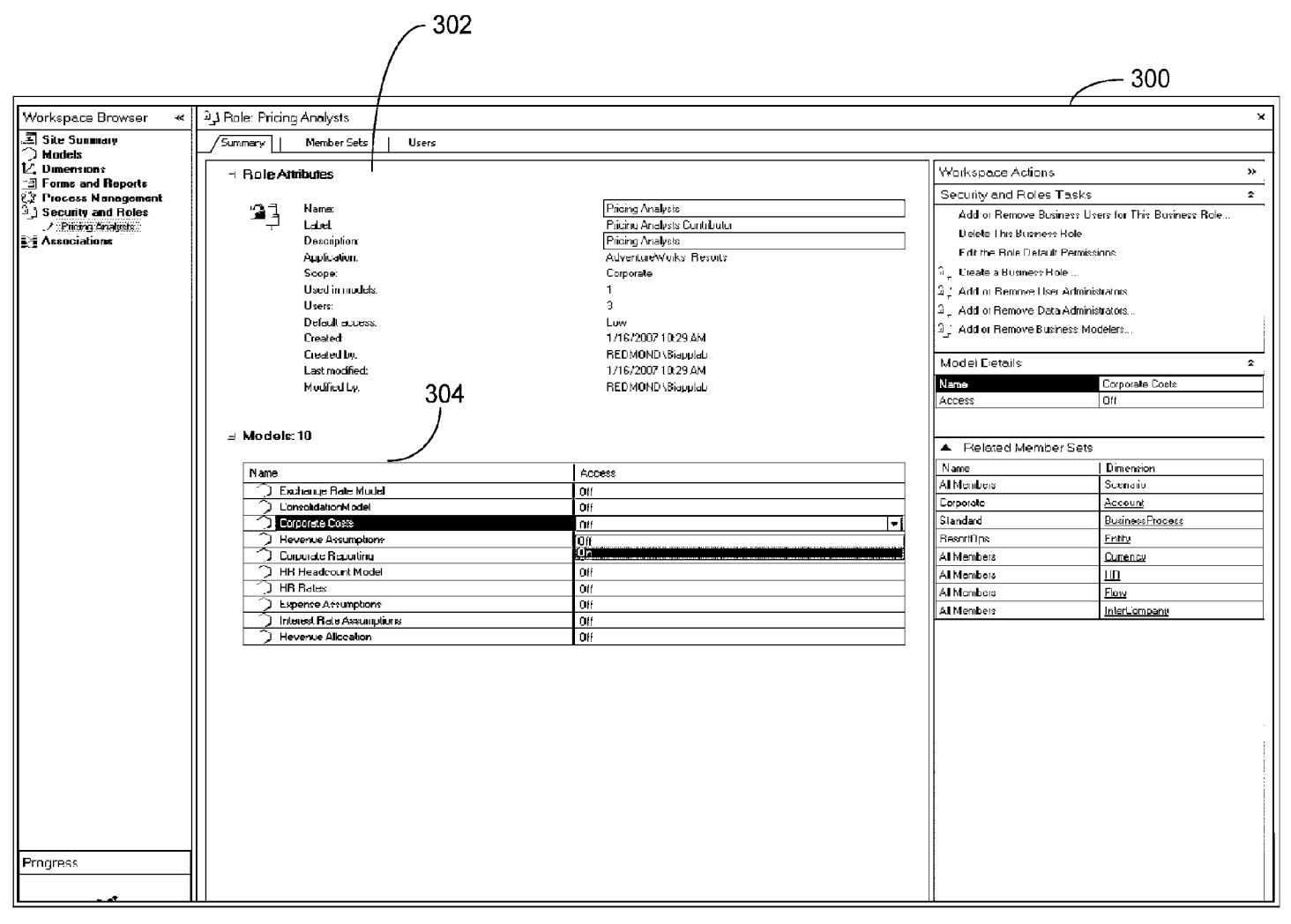

FIG. 3 represents an exemplary user interface view 300 for managing permissions of a model associated with a model site. Interface view 300 includes role attribute pane 302. Role attribute pane 302 indicates a role for association with a model. In this example, the business role is a "Pricing Analysts." Interface view 300 also includes model access pane 304. Model access pane 304 provides functionality for turning access to a model on and off for a role. In this example, turning "on" the corporate costs model for the business role "Pricing Analysts" ensures the correct permissions are enforced for the model corporate costs. In this example, the pricing analyst role (and any user in this role) has no permissions on any of the other models in the model site.

Figure 4:
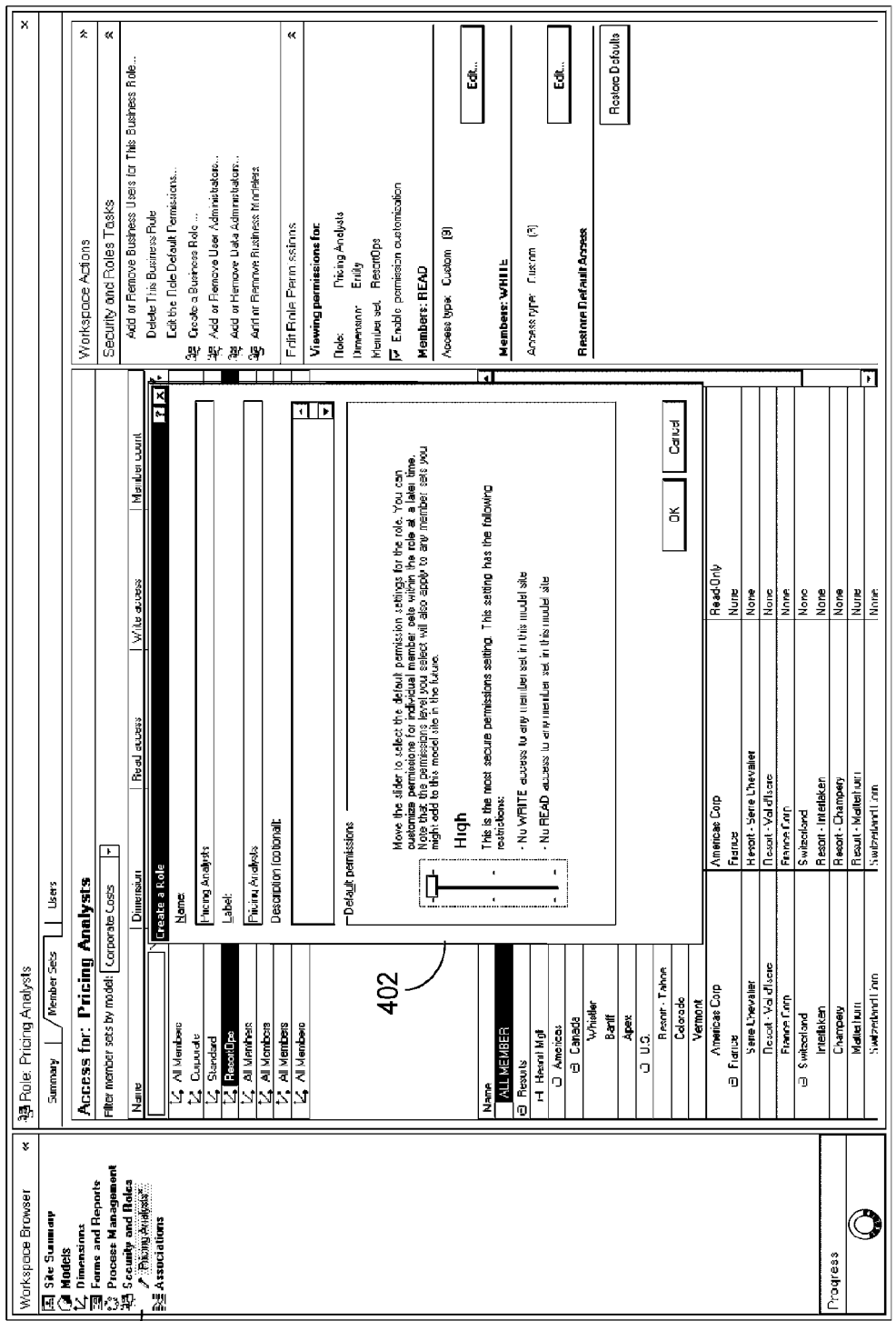
FIG. 4 represents an exemplary user interface view for setting a high default permission for a model associated with a model site.

FIG. 4 represents an exemplary user interface view 400 for setting a high default permission for a model associated with a model site. User interface view 400 includes a slider interface 402 for moving a default role permission between a high security and a low security. The slider facilitates selecting a default position for a group associated with the model site. The security level applies to all users of the group. The high setting is the most secure permission setting. When in the high setting, the group has no write access and no read access for the model site.

Figure 5:
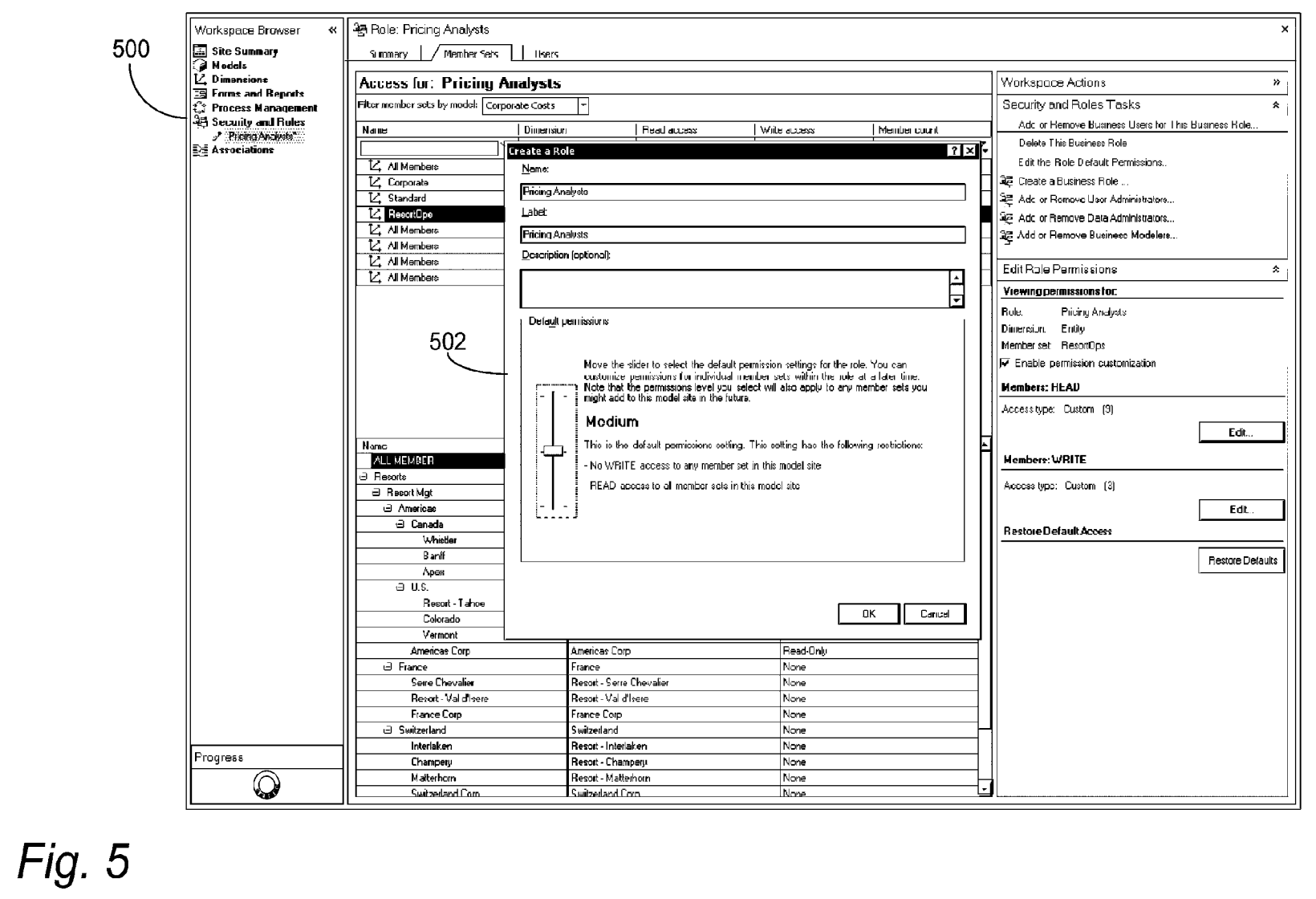

FIG. 5 represents an exemplary user interface view 500 for setting a medium default permission for a model associated with a model site. User interface view 500 includes a slider interface 502 for moving a default role permission between a high security and a low security. The slider facilitates selecting a default position for a group associated with the model site. The security level applies to all users of the group. When in the medium setting, the group has no write access but has read access for the model site.

Figure 6:
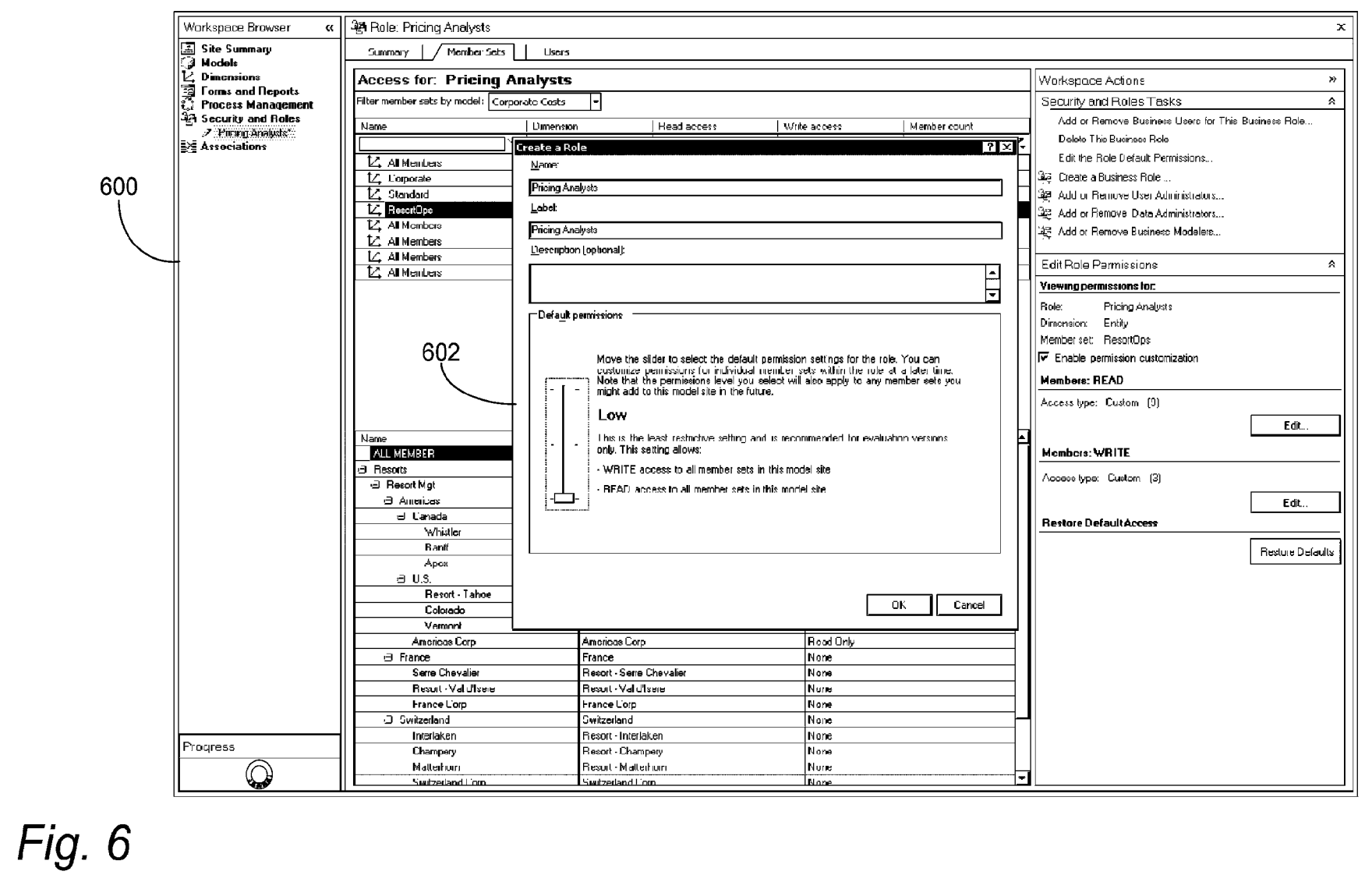

FIG. 6 represents an exemplary user interface view 600 for setting a low default permission for a model associated with a model site. User interface view 600 includes a slider interface 602 for moving a default role permission between a high security and a low security. The slider facilitates selecting a default position for a group associated with the model site. The security level applies to all users of the group. The low setting is the least restrictive permission setting. When in the low setting, the group has write access and read access for the model site.

Figure 7:
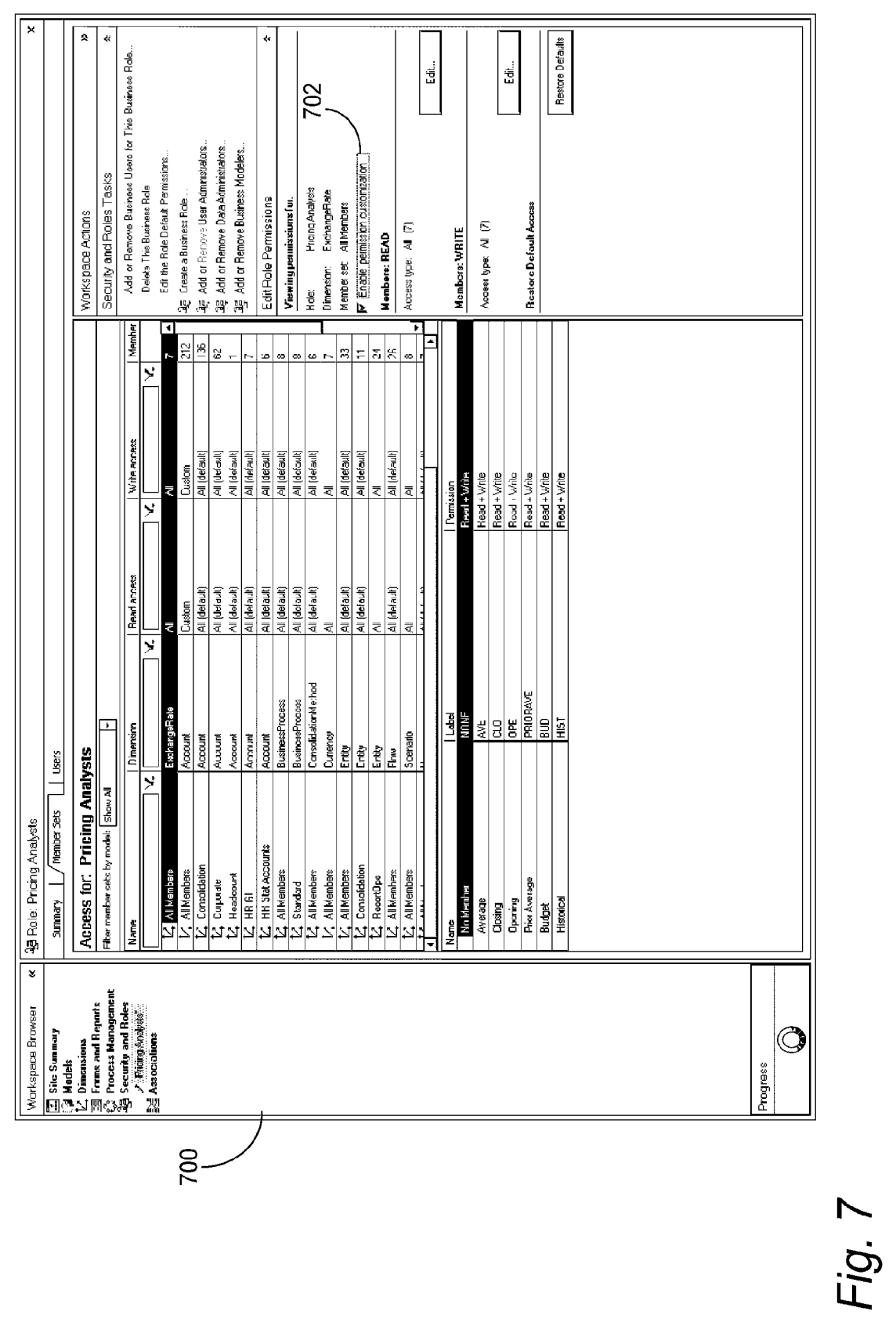

FIG. 7 represents an exemplary user interface view 700 for permission customization. User interface view 700 includes button 702 for enabling permission customization. Actuating button 702 ensures that users added to the group role may be further customized with regard to the users permissions for the member set of the business role. For example, a group may have a read-write permission. When the button 702 is actuated, a modeler may customize a user permission associated with the group to include a read only permission.

Figure 8:
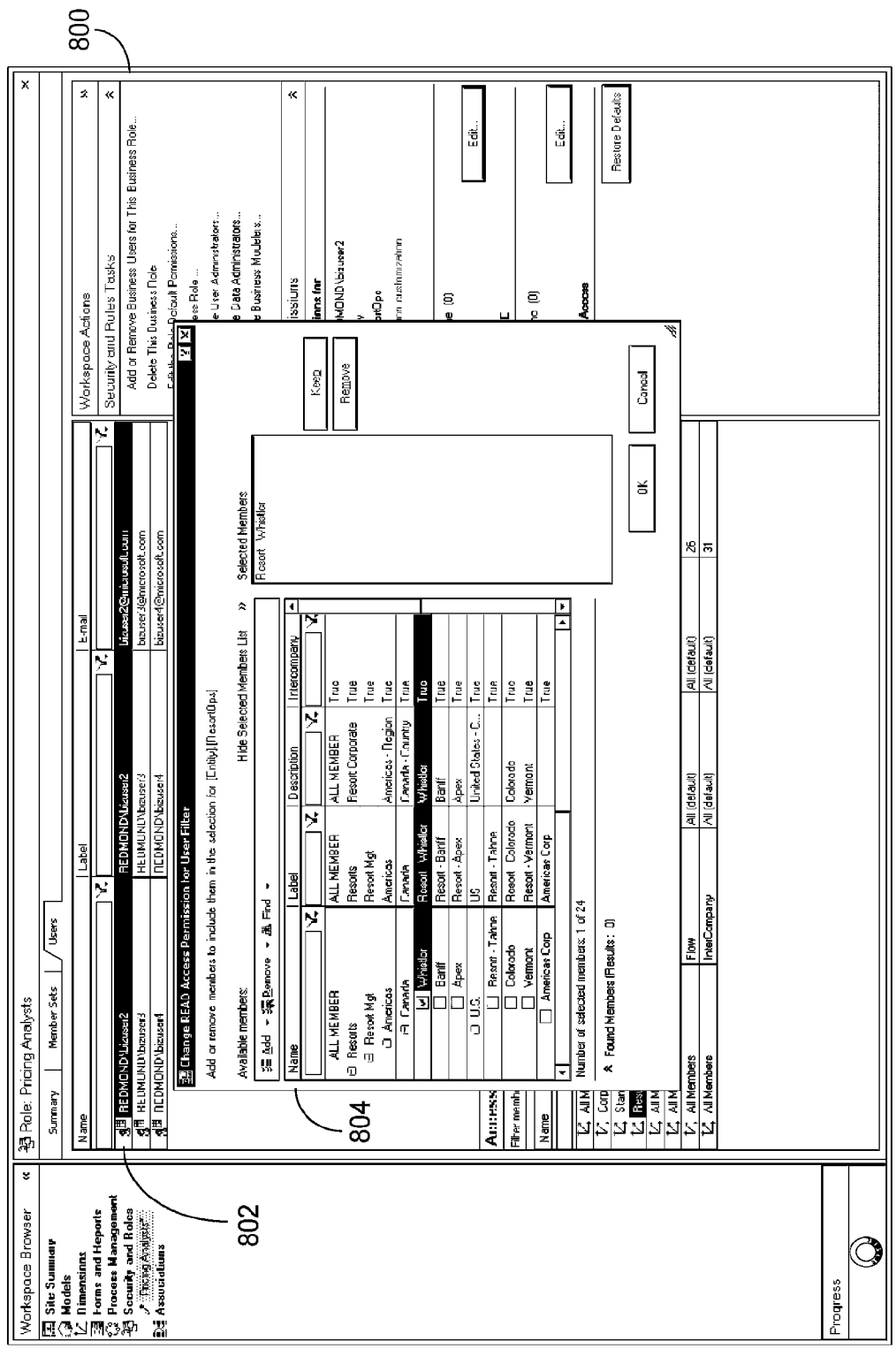
FIG. 8 represents an exemplary user interface view for customizing permissions for a user.

FIG. 8 represents an exemplary user interface view 800 for customizing permissions for a user. User interface view 800 includes user pane 802, which identifies users associated with a group role. User interface view 800 also includes customization pane 804. Customization pane 804 facilitates customizing user permissions associated with a group role. In one aspect, the maximum permission that may be associated with a user is limited to the permission of the group role.

Figure 9:
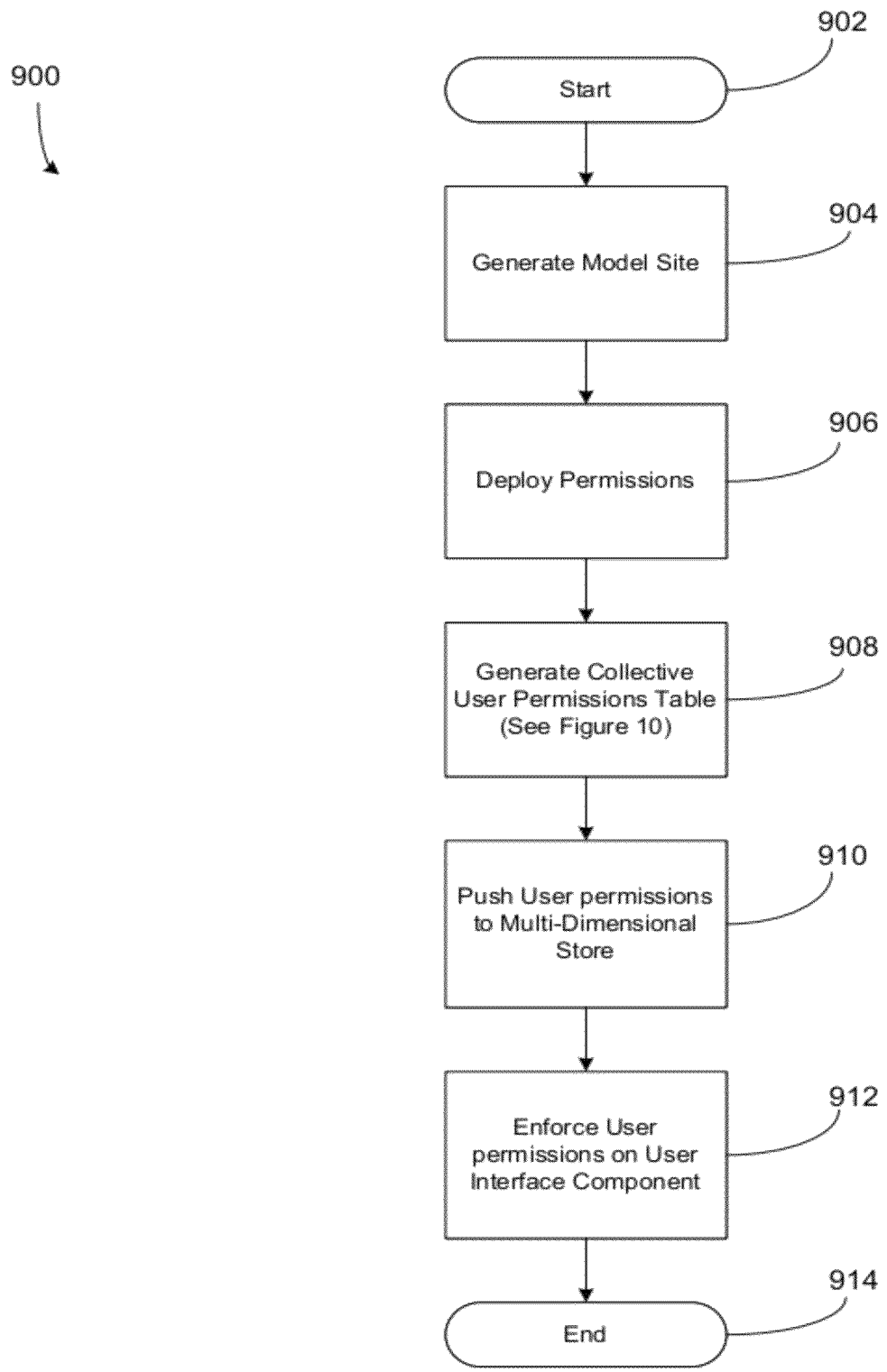
FIG. 9 represents an operation flow diagram for enforcing user permissions on a user interface component.

FIG. 9 represents an operation flow diagram for enforcing user permissions on a user interface component. Operation flow 900 begins at start block 902 and continues to operation 904 where a model is generated. The model may be associated with a model site and include one or more dimensions. For example, a model site may include a model site for the United States division of a company. A model may include an expense forecast for an upcoming year. The model may also include one or more dimensions. For example, a dimension may include a region of the United States, a time period, a product, and/or any other dimension configuration that may be associated with a multi-dimensional cube.

Permissions may be associated with the model site, on one of the models of the model site and/or a dimension of the model site. The permission may include group permission and/or user permissions. As an example, a group permission may include "regional managers" and the user permission may include a permission for one of the regional managers. Permission for the regional managers may be set to a "low" default. A user, who is a regional manager, may be given a permission that is high or further restricted from the low permission. In this manner, a modeler may customize permissions for a model site, model and/or a dimension of a model.

After the model is generated, the model may be deployed as represented by operation 906. The permissions may be deployed by a user input or deploying the permission may be automatic. The permissions are sent to a relational store via a serving component. Operational flow 900 flows to operation 908 where a collective user permission table is generated. The collective user permission table is further discussed in FIG. 10 below. Operational flow 900 continues to operation 910 where the collective user permissions are pushed to the multi-dimensional database. The multi-dimensional database generates one or more OLAP cubes via a Star Schema or other type of multi-dimensional schema such as a snowflake schema. User permissions are enforced on a user interface component as represented by operation 912. Stated another way, a user may query the generated OLAP cube. The data associated with the OLAP cube is secured in association with the collective user permissions. Operational flow 900 continues to end operation 914.

Figure 10:
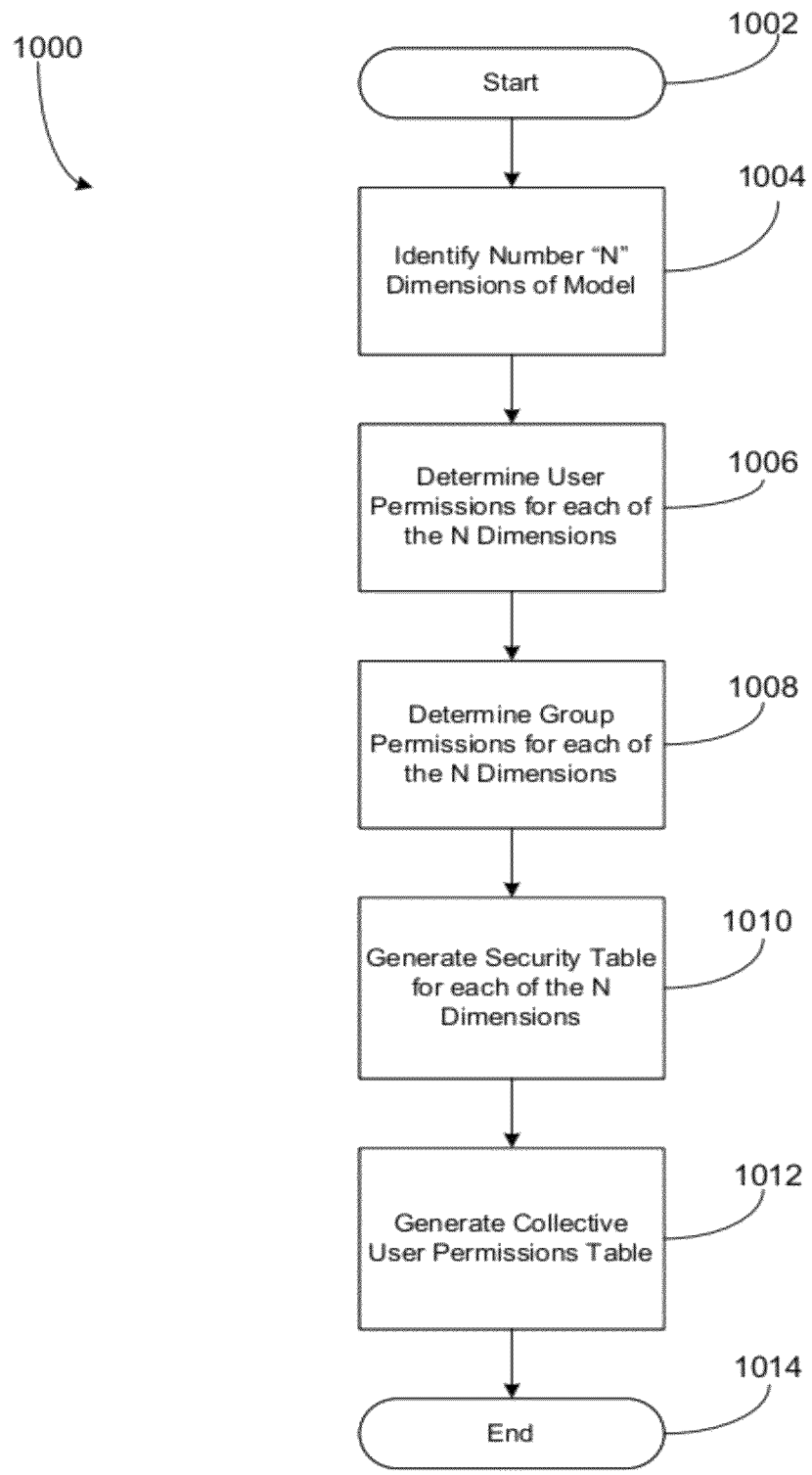
FIG. 10 represents an operational flow diagram for generating a collective user permissions table.

FIG. 10 represents an operational flow diagram for generating a collective user permissions table. Operation flow 1000 begins at start operation 1002 and continues to operation 1004 where "N" dimensions of the model are identified. For example, a model may include an X-dimension and a Y-dimension. In such a situation, N is two.

Operational flow 1000 continues to operation 1006. At operation 1006, user permissions are determined for each of the N dimensions. A user permission may include an access permission, such as, a read permission, a read-write permission and/or any other permission for securing data. A user permission may include a permission for the model site, model, and/or a dimension of the model.

EXAMPLE

A model includes dimensions X and Y
User1 can write data if (X=X0 and Y=Y0) or (X=X1).

Operational flow 1000 continues to operation 1008. At operation 1008, group permissions are determined for each of the N dimensions. A group permission may include an access permission, such as, a read permission, a read-write permission and/or any other permission permitted for securing data. A group permission may include a permission for the model site, model, and/or a dimension of the model. A user may be part of the group.

EXAMPLE

A model includes dimensions X and Y
Group1 can write data if (X=X2 and Y=Y2) or (Y=Y3)
User1 is a member of Group1.

Operational flow 1000 continues to operation 1010 where a security table for each of the N dimensions is generated.

EXAMPLE

| Security X | |
|---|---|
| Model ID | X |
| User1 - Model 1 | X0 |
| User1 - Model 2 | X1 |
| Group1 - Model 1 | X2 |

| Security Y | |
|---|---|
| Model ID | Y |
| User1 - Model 1 | Y0 |
| User1 - Model 1 | Y1 |
| Group1 - Model 2 | Y2 |

A Model table may also be generated.

EXAMPLE

| Model Table | |
|---|---|
| ObjectID | ModelID |
| User1 | User1-Model1 |
| User1 | User1- Model2 |
| Group1 | Group1- Model1 |
| Group1 | Group1- Model2 |

From security X and security Y an area view is created for the model. Following the above example, the area view is a union of user permissions and group permissions. In one aspect, the area view is generated as follows via Create View statement:

create view AreaView as
select objectId, X, Y from Models.
left outer join Security X on Models. ModelId=Security X ModelId.
left outer join Security Y on Models. ModelId=Security Y ModelId.

EXAMPLE

| Area View | | |
|---|---|---|
| ModelId | X | Y |
| User1 | X0 | Y0 |
| User1 | X1 | Null |
| Group1 | X2 | Y2 |
| Group1 | Null | Y3 |

The "Null" identifier is interpreted as no restriction to the dimension. If the Area view is pushed to the multi-dimensional store to define security, copies of Group1-Model1 and Group1-Model2 are copied into table Security X, table Security Y and the model table (with ObjectID=User1). This process is repeated for each user that is a member of the group. Such a process consumes a vast amount of system resources and may be inefficient for resolving the exact permissions for each user. Therefore, operational flow 1000 continues to operation 1012, where a collective user permissions table is generated from the above Area View and a User-Group relationship table.

EXAMPLE

| User-Group relationship table | |
|---|---|
| UserId | groupId |
| User1 | Group1 |

In one aspect, the collective permissions table is generated as follows via Create View statement:

create view collective permissions table as
select userId, X, Y from UserGroup, AreaView where userId=objectId or groupId=objectId.

EXAMPLE

| Collective User Permissions Table | | |
|---|---|---|
| UserId | X | Y |
| User1 | X0 | Y0 |
| User1 | X1 | NULL |
| User1 | X2 | Y2 |
| User1 | NULL | Y3 |

The collective user permissions table describes user membership in different groups. The area defined by the collective user permission table is defined by the user specific area definitions and the group specific area definitions. The collective user permissions table is a consolidated table in relation to the individual user permissions table and the independent group permissions table. From operation 1012, operation flow 1000 continues to end operation 1014.

As set forth herein, resolving user permissions and resolving group permissions are more efficient and versatile via the collective user permissions table. Also, the tacking of system resources is reduced by generating a collective user permission table to push from a relative store to a multi-dimensional store. Thus, an end user may receive permissions associated with a model and permissions associated with particular dimensions of a model without an inefficient consumption of resources.

Figure 11:
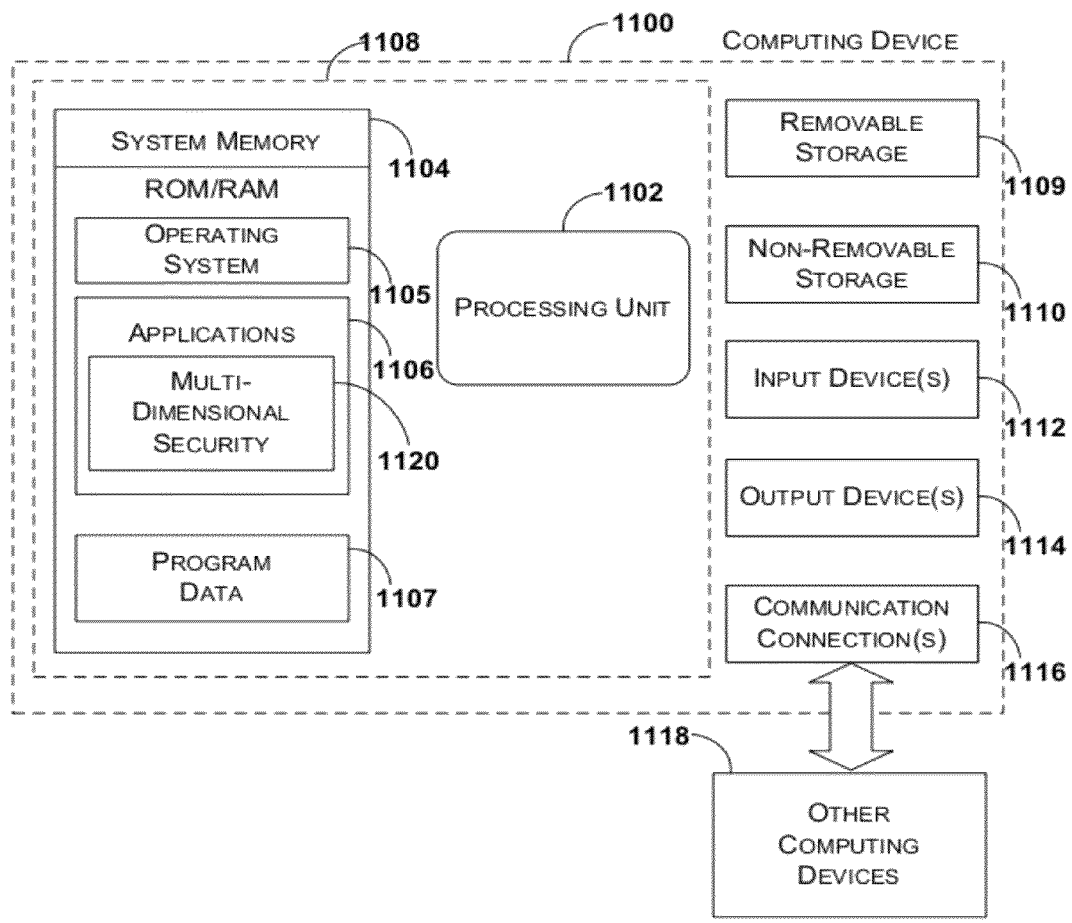
FIG. 11 represents an exemplary computing device for implementing multi-dimensional security.

Referring to FIG. 11, an exemplary system for implementing the invention includes a computing device, such as computing device 1100. In a basic configuration, computing device 1100 may include any type of stationary computing device or a mobile computing device. Computing device 1100 typically includes at least one processing unit 1102 and system memory 1104. Depending on the exact configuration and type of computing device, system memory 1104 may be volatile (such as RAM), non-volatile (such as ROM, flash memory, and the like) or some combination of the two. System memory 1104 typically includes operating system 1105, one or more applications 1106, and may include program data 1107. In one embodiment, applications 1106 further include application 1120 for providing multi-dimensional security. This basic configuration is illustrated in FIG. 11 by those components within dashed line 1108.

Computing device 1100 may also have additional features or functionality. For example, computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer storage media may include volatile and non-volatile, removable and non-removable media implemented in any method or technology for storage of information, such as computer readable instructions, data structures, program modules or other data. System memory 1104, removable storage 1109 and non-removable storage 1110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of device 1100. Computing device 1100 may also have input device(s) 1112 such as a keyboard, mouse, pen, voice input device, touch input device, etc. Output device(s) 1114 such as a display, speakers, printer, etc. may also be included.

Computing device 1100 also contains communication connection(s) 1116 that allow the device to communicate with other computing devices 1118, such as over a network or a wireless network. Communication connection(s) 1116 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A method for multi-dimensional security, comprising:
    displaying a graphical user interface for configuring multi-dimensional security for models having dimensions that are associated with a model site, the graphical user interface configured to:
        associate a group role with a model by receiving a selection of what models and what dimensions are to be associated with the group role;
        receive a selection for setting a group permission for the group role between a low permission and a high permission when determined;
        associate a user with the model and the dimensions that includes a user permission for accessing data associated with the model and the dimensions;
        display a permission customization selector that, when selected, enables receiving customizations to the user permission, wherein the user permission is associated with the group permission;
        in response to receiving the selection, store the user permission and the group permission within a relational data store;
        generate a collective user permissions table from the user permission and the group permission within the relational data store, wherein the collective user permissions table identifies collective user permissions based on the group permission for accessing data associated with the model and user permissions for accessing data associated with the model; and
        push the collective user permissions that are stored in the relational data store to a multi-dimensional store to provide multi-dimensional security for a multi-dimensional representation.

2. The method of claim 1, wherein receiving the selection for setting a default permission for the group role between a low permission and a high permission further comprises configuring the graphical user interface to:
    display options for setting the default permission to: a low permission that specifies read and write access; a medium permission that specifies read access and no write access, and a high permission that specifies no read/write access.

3. The method of claim 1, wherein the graphical user interface is further configured to:
    display role attributes for a role associated with a model comprising displaying a name, a number of times the role is used in models, and a number of users associated with the role.

4. The method of claim 3, wherein the graphical user interface is further configured to:
    display selectable options for setting access to each of a list of models on and off for the role.

5. The method of claim 4, wherein displaying the selectable options for setting access to each of a list of models on and off for the role further comprises configuring the graphical user interface to:
  display a selection interface next to a display of the model name that includes an on access option and an off access option.

6. The method of claim 1, wherein the graphical user interface is further configured to:
  display a security and roles tasks area that comprise options for adding users for a role, removing users for a role, and editing role default permissions.

7. The method of claim 1, wherein the graphical user interface is further configured to:
  display a user customization user interface display that identifies users associated with a role and displays a customization pane for customizing user permissions associated with a role.

8. The method of claim 7, wherein each user that is associated with the role is individually selectable.

9. The method of claim 7, wherein the graphical user interface is further configured to:
  display a number of users associated with different permissions within the role.

10. The method of claim 1, wherein the group permission is set by receiving a setting using a slider interface.

11. A computer-readable storage device having computer-executable instructions encoded thereon for providing multi-dimensional security, the instructions comprising:
  displaying a graphical user interface for:
    actuating models associated with a model site, wherein the models include a dimension that indicates a data category, and the dimension includes one of: a static dimension permission that locks the permissions of the dimension from customization and a dynamic dimension permission that allows permissions to be customized;
    associating a group role with one of the models, wherein the group role includes a group permission for accessing the model, and the group permission for the group role is set by a graphical interface that includes options for setting the group permission to: a low permission that specifies read and write access; a medium permission that specifies read access and no write access, and a high permission that specifies no read/write access;
    associating a user with the model, wherein the user is a member of the group role, and the user includes a user permission for accessing the model; and
    displaying a permission customization selector for receiving customization to the user permission, wherein the user permission is associated with the group permission.

12. The computer-readable storage device of claim 11, wherein the permission customization selector is associated with the dimension of the model for customizing a user permission associated with the dimension.

13. The computer-readable storage device of claim 11, wherein customizing the user permission includes receiving a selection of at least one member of a group comprising: no permission, total access permission, read permission, write permission, and read-write permission.

14. The computer-readable storage device of claim 11, wherein the group permission is set by receiving a setting using a slider interface.

15. The computer-readable storage device of claim 11, further comprising:
  displaying selectable options for setting access to each of a list of models on and off for the role.

16. The computer-readable storage device of claim 15, wherein displaying the selectable options for setting access to each of a list of models on and off for the role further comprising:
  displaying a selection interface next to a display of the model name that includes an on access option and an off access option.

17. A system for providing multi-dimensional security, the instructions comprising:
  a display;
  a processor; and
  a memory having computer executable instructions stored thereon, wherein the computer executable instructions, comprise:
    displaying a graphical user interface for configuring multi-dimensional security for models having dimensions that are associated with a model site, the graphical user interface configured to:
      associate a group role with a model by receiving a selection of what models and what dimensions are to be associated with the group role;
      receive a selection for setting a default group permission for the group role between a low permission and a high permission when determined;
      associate a user with the model and the dimensions that includes a user permission for accessing data associated with the model and the dimensions; and
      display a permission customization selector that, when selected, enables receiving customizations to the user permission, wherein the user permission is associated with the default group permission.

18. The system of claim 17, wherein receiving the selection for setting a default permission for the group role between a low permission and a high permission comprises displaying options for setting the default permission to: a low permission that specifies read and write access; a medium permission that specifies read access and no write access, and a high permission that specifies no read/write access.

19. The system of claim 17, wherein the graphical user interface is further configured to:
  display role attributes for a role associated with a model comprising displaying a name, a number of times the role is used in models, and a number of users associated with the role.

20. The system of claim 17, wherein the graphical user interface is further configured to:
  display a user customization user interface display that identifies users associated with a role and displays a customization pane for customizing user permissions associated with a role

\* \* \* \* \*